Jan. 27, 1959 R. C. BLAIR 2,870,694
MANUFACTURE OF CELLULAR STRUCTURES
Filed Dec. 8, 1954 8 Sheets-Sheet 2

Inventor
ROBERT COLVIN BLAIR
By Mead, Browne, Schuyler & Beveridge
Attorneys

Jan. 27, 1959 R. C. BLAIR 2,870,694
MANUFACTURE OF CELLULAR STRUCTURES
Filed Dec. 8, 1954 8 Sheets-Sheet 5

Inventor
ROBERT COLVIN BLAIR

Jan. 27, 1959  R. C. BLAIR  2,870,694
MANUFACTURE OF CELLULAR STRUCTURES
Filed Dec. 8, 1954  8 Sheets-Sheet 7

Inventor
ROBERT COLVIN BLAIR
By Mead, Browne, Schuyler & Beveridge
Attorneys

United States Patent Office

2,870,694
Patented Jan. 27, 1959

---

2,870,694

MANUFACTURE OF CELLULAR STRUCTURES

Robert Colvin Blair, Winnipeg, Manitoba, Canada, assignor to The British Plaster Board (Holdings) Limited, London, England, a British company Application December 8, 1954, Serial No. 473,924

Claims priority, application Great Britain January 20, 1955

9 Claims. (Cl. 93—37)

The present invention relates to cellulose structures of paper, paper board, cardboard or like material of the kind which have been widely used for the packaging of eggs, and in which one set of substantially parallel wall elements crosses a second set of substantially parallel wall elements, and in which the wall elements of each set are slotted depthwise at intervals so that at the crossing of each two wall elements each is partly received in a slot in the other to form a joint therebetween.

Such cellular structures may be used as cellular cores for hollow building units or panels wherein the cores are secured by an adhesive between facing boards.

In such cellular structures the wall elements of each set are usually of equal depth, and the slots usually extend across half the depth to form cross halving joints and so that the edges of both sets of wall elements lie substantially in the same planes. The above is the preferable form of construction of such cellular structures, but they can, of course, be made with one set of wall elements of greater depth than the other, or with the slots in the respective wall elements of unequal depth.

The object of the present invention is primarily to cheapen the manufacture of such cellular structures.

One feature of the present invention consists in a method of assembling such cellular structures and of manufacturing and assembling them, which comprises advancing a set of parallel strips of wall element material relatively to a source or supply of slotted wall elements arranged across the path of travel of said strips in a direction parallel with at least one set of aligned slots in said strips, and removing wall elements in succession from said source or supply into engagement with aligned slots in said strips in timed relation with the advancement of said strips.

A further feature of the invention comprises mechanically advancing a set of parallel strips of wall element material of length unrelated to the length or width of the cellular structure to be made, longitudinally relatively to a source or supply of slotted wall elements of given length arranged across the path of travel of said strips in a direction parallel with at least one set of aligned slots in said strips, and mechanically removing wall elements in succession from said source or supply into engagement with said aligned slots in said strips in timed relation with the advancement of said strips.

A further feature of the invention consists in advancing said strips intermittently in timed relation with the removal of wall elements from said source or supply.

A further feature of the invention consists in advancing said strips intermittently by distances equal to the longitudinal spacing of the slots in said strips by pushing against a wall element already fed into engagement with the strips, and preferably by pushing against the wall element which was last moved into engagement with said strips.

A further feature of the invention consists in continuously forming said strips from a supply of paper, paper board, cardboard or other suitable sheet material, preferably in the form of a roll, while advancing the strips so formed relatively to said source or supply of slotted wall elements.

A still further feature of the invention consists in forming longitudinally spaced slots in said strips in sequence as said strips are advanced towards said source or supply of wall elements, or alternatively in forming longitudinally spaced slots in sequence in the sheet material from which said strips are made as said sheet material is advanced towards said source or supply of wall elements.

In one mode of carrying the invention into effect paper board or other suitable sheet material is drawn from a roll thereof and is slit longitudinally into a plurality of strips which are advanced and turned through approximately 90° about axes substantially parallel to their longitudinal direction and are guided so as to keep their faces parallel with and substantially equally spaced from one another whereupon sets of slots in transverse alignment across the path of travel of the strips are formed in succession in said strips and slotted wall elements are withdrawn from a source or supply thereof and moved in succession into engagement with the aligned slots in said strips, the advancement of the parallel strips being intermittent and achieved by pushing against each wall element in succession after it has been moved into engagement with said strips to advance the strips in steps equal to the longitudinal spacing of the slots formed therein.

Another mode of carrying the invention into effect is to draw paper board or other suitable sheet material from a roll and whilst traversing the sheet material away from the roll to form successive rows of transverse slots therein, then to slit the sheet material longitudinally through said slots to form a plurality of strips with slots extending from the edges thereof, whereafter the strips are turned about axes substanially parallel with their length to bring the slotted edges thereof uppermost and the strips are drawn along a substantially horizontal plane in substantially equally spaced parallel disposition with the slots in transverse alignment and are passed beneath a source or supply of slotted wall elements of given length which are withdrawn in succession from said supply and moved into engagement with the aligned slots in the strips in timed relation with the advancement of the strips relatively to said source or supply whereupon, at intervals during which a pre-determined number of wall elements are engaged with the strips, the strips are severed between two adjacent wall elements to detach a predetermined length of cellular structure therefrom.

The apparatus of the present invention includes guide means for maintaining a plurality of slotted strips of wall element material on edge in parallel spaced relationship, means for advancing said strips in the direction of their length, supply means arranged to deliver slotted wall elements so that they extend lengthwise in a direction across the path of travel of said strips, and presser means associated with said supply means adapted to receive wall elements in succession from said supply means and to deliver them into engagement with aligned slots in said strips in timed relationship with the advancing of the strips.

Preferably the supply means comprises a magazine to contain a supply of slotted wall elements extending lengthwise across the path of travel of said strips.

Said advancing means may consist of a reciprocating pusher located beneath said presser means and adapted to engage behind a delivered wall element to advance the strips. The pusher may be formed so as to support the strips from below while the presser means delivers a wall element into engagement with a row of slots in the strips. The said pusher may also serve as a guiding means for said strips to assist in keeping them in an upright and equally spaced parallel relationship in the region of the presser means.

Said presser means and said pusher means may be arranged at one end of a platform along which said strips are fed from the other end thereof and guiding means is preferably provided on said platform to hold the strips in an upright and equally spaced parallel relationship. Said last mentioned guiding means may embody resilient elements engaging on opposite sides of the strips.

Said presser means may consist of a presser plate extending across the outlet end of the magazine transversely of the direction of movement of the strips and having a shallow recess in one face thereof into which a preformed wall element partially protruding from the magazine can be partially received and by means of which a wall element partially received therein can be pressed downwardly from the magazine into engagement with a row of slots in the said strips.

The invention includes a suitable slitting means adapted to slit sheet wall element material such as paper board longitudinally into a number of strips. Said slitting means may consist of a number of spaced rolls arranged on one side of the path of the sheet material which rolls receive therebetween a small sector of a number of similarly spaced rolls located on the other side of the sheet material, the opposing edges of the opposite rolls serving as circular knives whereby to slit the sheet material. Alternatively any other suitable form of slitting device may be employed.

The invention also includes slotting means for forming slots either in the edges of strips of wall element material such as paper board or in the sheet material before it is slit into strips. In the former case the slotting means is preferably arranged just in advance of the presser means and consists of a set of dies, one for each strip, extending transversely of the path of the strips and serving also as guides for the strips and a corresponding set of punches displaceable relatively to the dies in said transverse direction. The said slotting means is preferably arranged in advance of the presser means by a distance equal to a multiple of and preferably twice the longitudinal spacing of the slots in said strips. Alternatively rows of transverse slots may be formed in the sheet material by a reciprocating press prior to the slitting of the sheet material into strips. In this case the press is adapted to form slots of twice the length of the slots required in the strips and the slitting means is arranged to slit the sheet material through the midlengths of the slots so formed and midway between the slots to produce strips with slots extending from one edge thereof.

The invention furthermore includes a guillotine or severing device for cutting the strips substantially simultaneously between two adjacent wall elements to detach cellular structures of any desired lengths. The said guillotine may consist of a pair of blade carriers having blades extending downwardly therefrom and one of which is longitudinally displaceable relatively to the other in a direction across the path of travel of the formed cellular structure. The said blade carriers may be angularly displaceable about a fixed pivot from a raised position above the path fo travel of the cellular structure down to a position in which the blades of the respective blade carriers lie on opposite sides of the strips of the formed cellular structure. The blade carriers may be angularly displaced by a crank or its equivalent which is actuated at intervals by a constantly rotating shaft through a so-called one revolution clutch which automatically disengages itself after having performed a single revolution. Said one-revolution clutch may be controlled by a relay governed by a switch under the influence of a counting device associated with the advancing means or said presser means whereby to engage the clutch at intervals during which a predetermined number of wall elements have been fed to the strips.

The relative cutting movement of said blade carriers may be performed under the influence of a compression spring which is loaded automatically by the upward movement of the blade carriers after a cutting operation and locked into its loaded condition by a detent element which is tripped automatically as the blade carriers approach their lowermost angular position.

The invention is further described by way of example with reference to the accompanying drawings in which.

Figure 1:
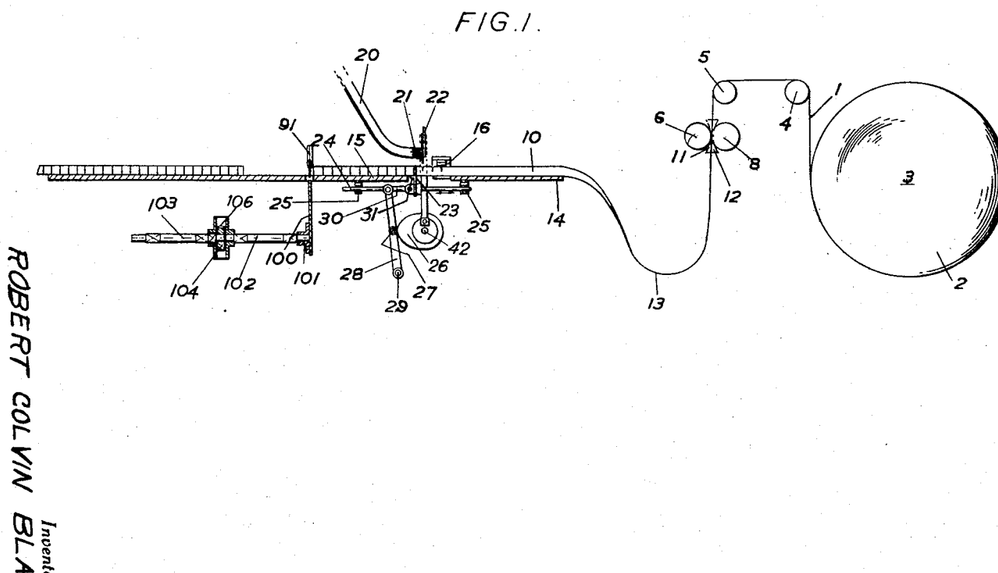
Fig. 1 is a diagrammatic side elevation illustrating one mode of carrying the invention into effect.

Referring to Fig. 1 paper board 1 is drawn from a roll thereof 2 rotatable about an axis 3 and is passed over guide rolls 4, 5 to a set of slitting rolls consisting of rolls 6 on a shaft 7 and rolls 8 on a shaft 9 (Figs. 1 and 2), the shafts 7 and 9 being parallel to one another but having their axes spaced apart by a distance less than the sum of the radii of the rolls 6 and 8, so that the rolls 6 project into the spaces between the rolls 8 and vice versa whereby to slit the paper board 1 into strips 10. Curved guide elements 11 are arranged between the rolls 6 and similar curved guide elements 12 are arranged between the rolls 8 (shown in Fig. 1 only) to ensure that the strips 10 are disengaged from the rolls 6 and 8.

The strips 10 are allowed to sag in a loop 13 from which they are fed to a platform 14, being turned through approximately 90° about an axis parallel to their length so as to bring them into a vertical position with their lower edges resting upon the platform 14. Strips 10 are guided on the platform 14 to maintain their vertical disposition and to keep in substantially equal transversely spaced parallel relationship. It is the guiding of the strips 10 on the platform 14 which causes them to turn through the aforesaid 90°.

The strips 10 are fed from the platform 14 to a second platform 15 and a slotting device 16 which will be hereinafter more particularly described is arranged at the left hand end of the platform 14 to punch sets of slots 17 (Fig. 5) transversely through the strips 10.

Figure 3:
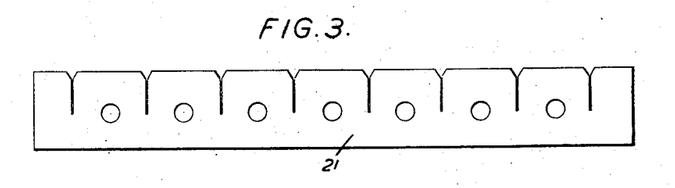
Fig. 3 illustrates a pre-formed transverse wall element.

A magazine 20 (Figs. 1 and 4) adapted to contain a supply of pre-formed wall elements 21 as illustrated in Fig. 3 descends towards the path of the strips 10 from above the platform 15 and a vertically reciprocable presser plate 22 extends across the outlet end of the magazine 20 in a direction running across the strips 10. The function of the presser plate 22 is to withdraw wall elements 21 from the magazine 20 one at a time and to press them respectively into an aligned set of slots 17, formed in the strips 10.

The strips 10 are fed stepwise in a direction from right to left as viewed in Fig. 1 by means of a pusher 23 mounted on a pusher carriage 24 which is guided for horizontal reciprocating movement in guides 25 beneath the platforms 14, 15 driven by a cam 26 which engages a cam follower 27 mounted on a lever 28 pivoted at its lower end about a fixed pivot 29 and pivotally connected at its upper end to the pusher carriage 24 through a link 30. The lever 28 may be spring loaded against the cam 26, or, alternatively, the follower 27 may engage in a cam slot in the side face of an alternative form of cam 26.

The pusher 23 is provided at its left hand side with a horizontal step 31 whose upper surface is in the plane of the platforms 14, 15. The step 31 serves to support strips 10 between the platforms 14, 15 and in particular to support the strips at a position immediately beneath the presser plate 22 at the times when the presser plate is moving downwardly to feed a wall element 21 into engagement with the strips 10.

Immediately above the step 31 the pusher 23 continues upwardly in the form of pairs of upstanding upward aligned projections 32, 33 (Fig. 4) each spaced apart by a slit which serves as a guide for one of the strips 10. Each pair of projections 32, 33 are spaced apart from the next pair by a distance sufficient to enable them to pass between fingers 34 extending downwardly from the presser plate 22.

The pusher 23 is shown in Fig. 1 in a position which coincides with the end of its forward feeding movement from right to left. The movements of the pusher 23 and the presser plate 22 are so timed that the pusher 23 will move to the right whereupon the presser plate 22 will move downwardly to feed a wall element 21 into engagement with a set of aligned slots 17 of the strips 10 whereupon the pressure plate 22 will rise and the pusher 23 will move again from right to left so as to feed the strips 10 by pushing against the wall element 21 last fed into engagement with the strips 10.

The presser plate 22 is mounted in fixed vertical guides 36, 37 and is moved up and down by connecting rods 38 whose upper ends are pivoted at 39 to the ends of the presser plate 22 and whose lower ends are pivoted at 40 to crank discs 41 mounted on a shaft 42 on which the cam 26 is also mounted.

The magazine 20 is pivoted about a pivot 44 to the guide 37 so that it can be opened away from the presser plate 22. The magazine 20 is shown in its open position in Fig. 4. To hold the magazine 20 in a closed position adjacent the presser plate 22 it is provided with a lug 45 adapted to engage in a slot 46 of a jaw 47 on guide 36 and the lug 45 and jaw 47 have holes 48, 49 therein to receive a locking pin.

At its outlet end the magazine 20 is provided with a vertical mouthplate 50 having an opening 51 therein through which the wall elements 21 can emerge to engage retaining posts 52 secured at their upper ends to plate 50 and stepped at the upper margin 53 of the opening 51 to enable a portion of the thickness of the endmost wall element 21 to enter a recess 54 (Fig. 4) in the presser plate 22. The recess 54 in the presser plate affords a narrow pushing face 55 (see Fig. 5) of depth approximately equal to two-thirds of the thickness of the wall elements 21. The base 56 of the magazine 20 terminates at the discharge end of the magazine short of the face of the presser plate fingers 34 (Fig. 5) so that it engages under about two-thirds of the thickness of the penultimate wall element leaving the endmost wall element 21 free to be moved downwardly by the presser plate 22.

During the downward movement of a wall element 21 from the magazine 20 it is guided on its opposite faces by the fingers 34 of the presser plate on one side and by presser springs 57 on its other side. The presser springs 57 are secured to the underside of the base 56 of the magazine.

Figure 5:
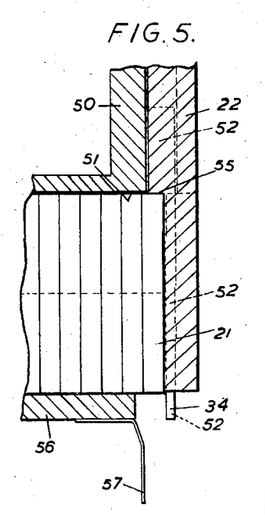
Fig. 5 is a fragmentary longitudinal sectional view of the magazine and presser device.

Fig. 5 illustrates the relative positions of the outlet end of the magazine and the slots 17 of the strips 10, and from Figs. 1 and 5 it will be clear that the presser plate 22 is spaced from the centre of the slotting device 16 by a distance equal to twice the spacing of the slots 17.

In the arrangement shown in Fig. 1, the slots 17 are formed in the strips 10 after the strips themselves have been formed from the paperboard 1 and almost immediately before the wall elements 21 are fed into the slots on the strips 10.

The slotting device 16 is driven from a cam shaft 60 (shown in Fig. 6 but not in Fig. 1) located beneath the path of travel of the strips 10 and rotated in timed relation with the shaft 42. The timing of the cam shaft 60 is such that the slotting device 16 operates to form a set of aligned slots in the strips 10 during the movement of the pusher 23 from left to right and whilst the presser plate 22 is in a raised position.

Figure 6:
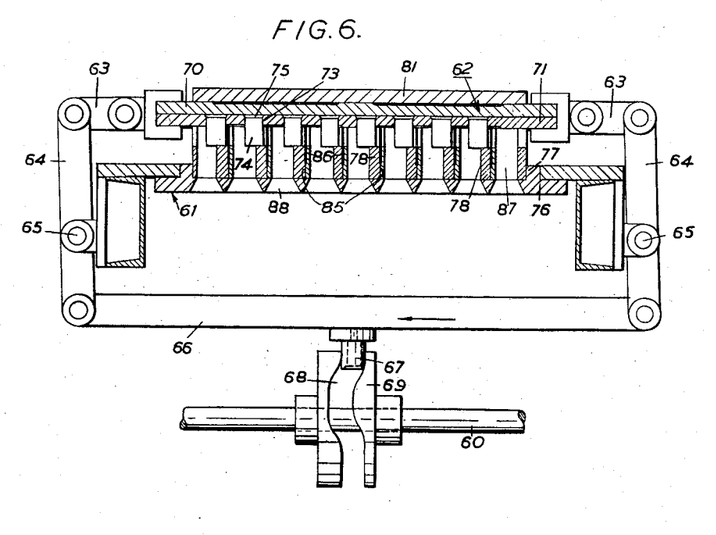
Fig. 6 is a transverse sectional view of the slotting device diagrammatically shown in Fig. 1.
Figure 7:
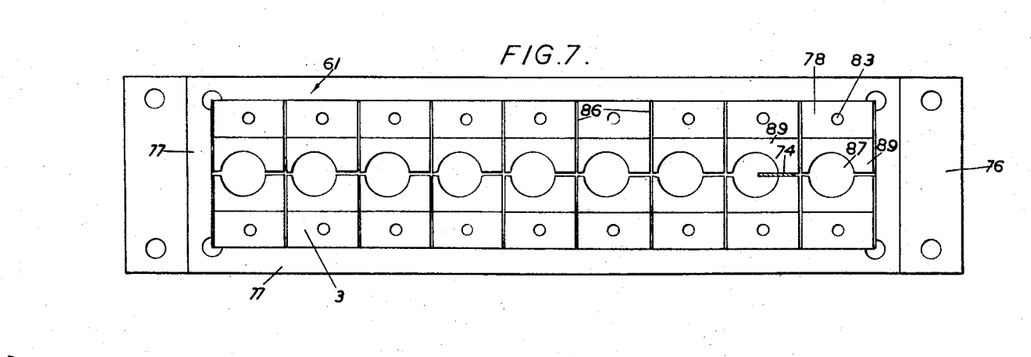
Fig. 7 is a plan view illustrating the slotting dies of Fig. 6.
Figure 8:
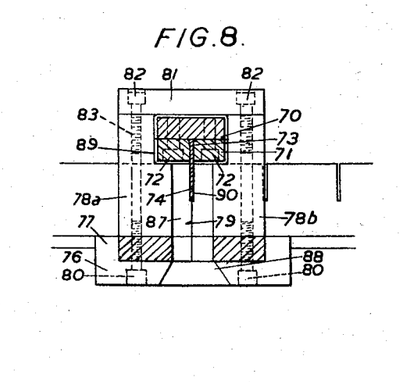
Fig. 8 is a sectional view through the slotting device of Fig. 6 taken in a transverse direction of the slotting device, i. e. in the longitudinal direction of the machine.

The slotting device 16 is illustrated in more detail in Figs. 6, 7 and 8. The slotting device consists of a stationary die 61 and a movable punch bar 62, the latter being pivotally connected at its upper ends through short links 63 to parallel levers 64 pivoted about fixed pivots 65 and pivoted at their lower ends to a bar 66 parallel to the punch bar 62 and having a cam follower 67 engaging in the slot 68 of a cam 69 mounted on the cam shaft 60. Rotation of the cam 69 will cause longitudinal displacement of the bar 66 and thus of the punch bar 62 in the longitudinal direction of the die 61 i. e. in a direction across the path of travel of the strips 10.

The punch bar 62 is a composite bar formed of upper and lower bars 70, 71 which are secured together by screws 72 (Fig. 8). The lower bar 71 has spaced longitudinal slots 73 running therethrough at the midwidth thereof to receive punch blades 74. The punch blades 74 at their upper ends have tapered enlargements 75 which engage in corresponding enlargements at the upper ends of the slots 73. The punch blades 74 are an accurate fit in the slots 73 and the clamping of the bar 70 to the upper face of the bar 71 ensures that the punch blades 74 are held fixedly in position in the bar 70.

The die 61 consists of a baseplate or die holder 76 having a shallow rectangular wall 77 defining a shallow rectangular well in which are received nine die elements in the form of die blocks 78 each formed in two halves 78a, 78b (Fig. 8) which meet at their faces 79 and which are secured in the well of the baseplate 76 by screws 80. The die blocks 78 are secured relatively between one another and their halves are further secured together by means of a cover plate 81 and screws 82 (Fig. 8) which engage in threaded openings 83 in the upper faces of the die blocks (Figs. 7 and 8).

The die blocks 78 are outwardly stepped as at 85 towards the lower ends of their opposing faces (which are transverse in relation to the die and longitudinal in relation to the direction of movement of the strips 10) whereby to afford between each adjacent pair of die blocks a guide slit 86 for the movement therebetween of the strips 10. The lower ends of the guide slits 86 are level with the platforms 14, 15 of Fig. 1.

Each die block 78 has an approximately cylindrical opening 87 passing vertically therethrough at the midwidth thereof in alignment with a corresponding opening 88 in the baseplate 76.

Each die block is formed with a longitudinal rectangular castellation or recess 89 at the upper end thereof in which the punch bar 62 is received. Beneath the recess 89 each die block is formed with a slot 90 in which the punch blades 74 are received. The punch receiving slots 90 in the die block 78 are formed by recesses in the opposing faces 79 of the die block halves 78a, 78b thereby facilitating the grinding of the operative faces of the punch when worn.

To perform a punching operation the punch 62 moves from left to right as viewed in Figs. 6 and 7.

A further feature of the invention is a cutting device or guillotine which is adapted to sever the strips 10 between two wall elements 21 in order to detach a formed cellular structure of given length containing a given number of wall elements 21. A cutting device or guillotine for this purpose is diagrammatically indicated in Fig. 1 by the reference numeral 91 and is illustrated in more detail in Figs. 9 and 10.

The guillotine embodies a blade carrier 92 pivotally mounted through a pivot pin 93 on a fixed bracket 94 and a second blade carrier 95 which is movable lengthwise relatively to the blade carrier 92. The blade carrier 92 has mounted thereon a series of blades 96 of which one can be seen near the righthand end of blade carrier 92 as viewed in Fig. 9. The blade carrier 95 carries a series of blades 97 having cutting edges 98 opposed to cutting edges 99 of the blades 96.

Figure 9:
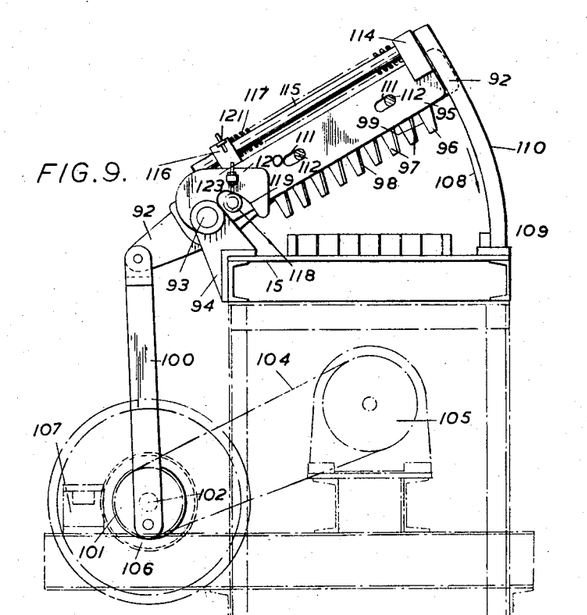
Fig. 9 is a view taken endwise of the machine illustrating a guillotine device shown diagrammatically in Fig. 1.

At its lefthand end as viewed in Fig. 9 the blade carrier 92 (which lies behind blade carrier 95) is pivotally connected to the upper end of a connecting rod 100 which at its lower end is journalled to a crank disc 101 mounted on a shaft 102 (Figs. 1 and 9). A shaft 103 (Fig. 1) is continually driven through a chain drive 104 (Fig. 9) by an independent electric motor 105. The shaft 102 can be clutched to the shaft 103 by a clutch 106 which is indicated diagrammatically in Figs. 1 and 9 and which is of a known type which is often referred to as a "One revolution" clutch in that a trip can be operated to cause engagement thereof whereupon after a single revolution the clutch will automatically disengage itself. An electrically operated trip is diagrammatically indicated at 107 in Fig. 9. A counting device operated by any suitable part of the machine such for example as the pusher carriage 24 is adapted, after a prescribed number of wall elements 21 have been moved into engagement with the strips 10, i. e. after a prescribed number of reciprocations of the pusher carriage 24, to close a switch which energizes a solenoid to cause displacement of an armature in the trip 107 to allow the clutch 106 to engage and to rotate the shaft 102 and the crank disc 101 through a single revolution to cause the blade carriers 92 and 95 to move downwards in the direction of the arrow 108 until the blade carrier 92 engages a fixed abutment block 109 and then to return to the position shown in Fig. 9.

The end of the blade 92 is guided in a guide 110 extending upwardly from the edge of the platform 15.

The longitudinally displaceable blade carrier 95 has slots 111 therein to receive pins 112 fixed to the blade carrier 92 and extending through the slots. At their ends the pins 112 are threaded to receive nuts and washers (not shown) which hold the blade carrier 95 in position on the blade carrier 92 whilst permitting longitudinal displacement of the blade carrier 95 relatively to the blade carrier 92.

Blade carrier 95 has secured thereto at its righthand end a block 114 having a spindle 115 which slidably passes through an opening in a block 116 fixed to the blade carrier 92. A compression spring 117 is mounted on the spindle 115 and abuts against the blocks 114, 116 and thereby tends to move the blade carrier 95 to the right (as viewed in Fig. 9) to perform a cutting operation. A roller 118 mounted on the face of the blade carrier 95 is adapted on upward movement of the blade carriers after a cutting operation to engage the face 119 of a fixed cam 120 whereby to move the blade carrier 95 to the left against the compression of spring 117 whereby to load the spring 117 and to set the blade carrier 95 in an appropriate position ready for subsequent cutting operation. Near its lefthand end the spindle 115 has a transverse slot therein which is adapted to be engaged by a detent element 121 pivoted at 122 (Fig. 10) in a slot formed in the top of the block 116. The detent element 121 is adapted to fall into engagement with the slot in the spindle 115 when the blade carrier 95 has been moved to its lefthand terminal or loaded position under the influence of the roller 118 and the cam face 119 whereby to hold the blade carrier 95 in its terminal position independently of the roller 118.

An adjustable stop 123 mounted on the side of the cam 120 is positioned so as to be engaged by the detent element 121 as the blade carriers 92, 95 approach the end of their path of travel towards the platform 15 whereby to release the detent 121 and to allow the blade carrier 95 and its blades 97 to move to the right under the action of the spring 117 to perform a cutting operation. The detent element 121 is released by the stop 123 just before the blade carriers reach their lowermost position to enable the blades 96, 97 to perform the cutting operation substantially exactly at the bottom of the stroke of the blade carriers.

Figure 10:
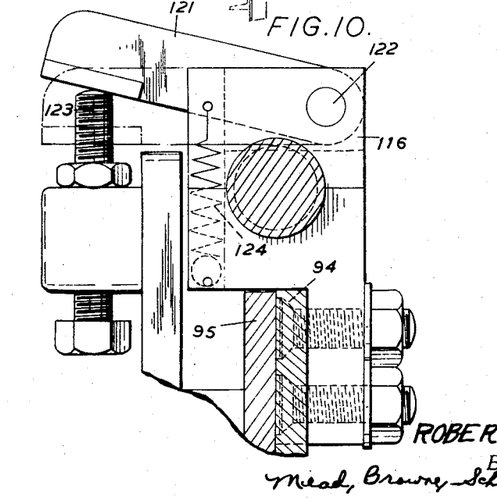
Fig. 10 is a fragmentary sectional view of a portion of Fig. 9.

A spring 124 housed in a substantially vertical slot or aperture in the block 116 tends to draw the detent element 121 in the downward direction (see Fig. 10).

Figure 2:
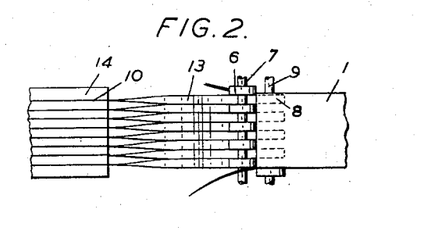
Fig. 2 is a plan view corresponding to a portion of Fig. 1.
Figure 11:
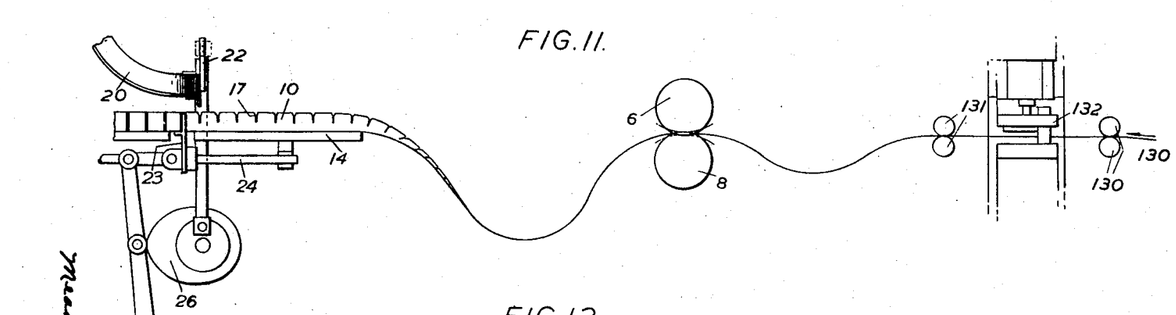
Fig. 11 is a diagrammatic side view illustrating a second mode of carrying the invention into effect.
Figure 12:
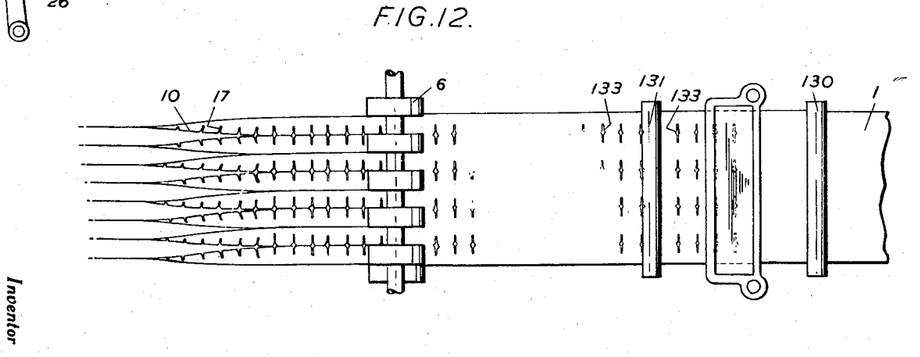
Fig. 12 is a plan view corresponding to part of Fig. 11.

Figs. 11 and 12 illustrate an alternative mode of carrying the invention into effect in which paper board 1 is drawn from a roll thereof (not shown) similar to roll 2, Fig. 1, and is passed between pairs of feed rolls 130, 131 between which is arranged a press 132 indicated diagrammatically in Figs. 11 and 12 and which punches successive rows of transverse slots 133 in the paper board 1 after which the paper board 1 passes between slitting rolls 6, 8 similar to those shown in Figs. 1 and 2 which slit the board longitudinally at the midwidth of the slots 133 and between the slots 133 to produce strips 10 with slots 17 therein similar to the slotted strips 10 shown in Fig. 1. The strips 10 then pass to platform 14 and beneath magazine 20 and presser plate 22 as in Fig. 1 but in this mode of carrying the invention into effect the slotting device 16 of Fig. 1 is not of course required.

A further feature of the invention consists in delivering the wall elements 21 formed in a reciprocating press to a shaker conveyor or tray along which they progress by virtue of the shaking or vibration of the conveyor or tray and on which they gradually move into an erect or more or less erect position with their edges resting on the conveyor or tray.

Figure 13:
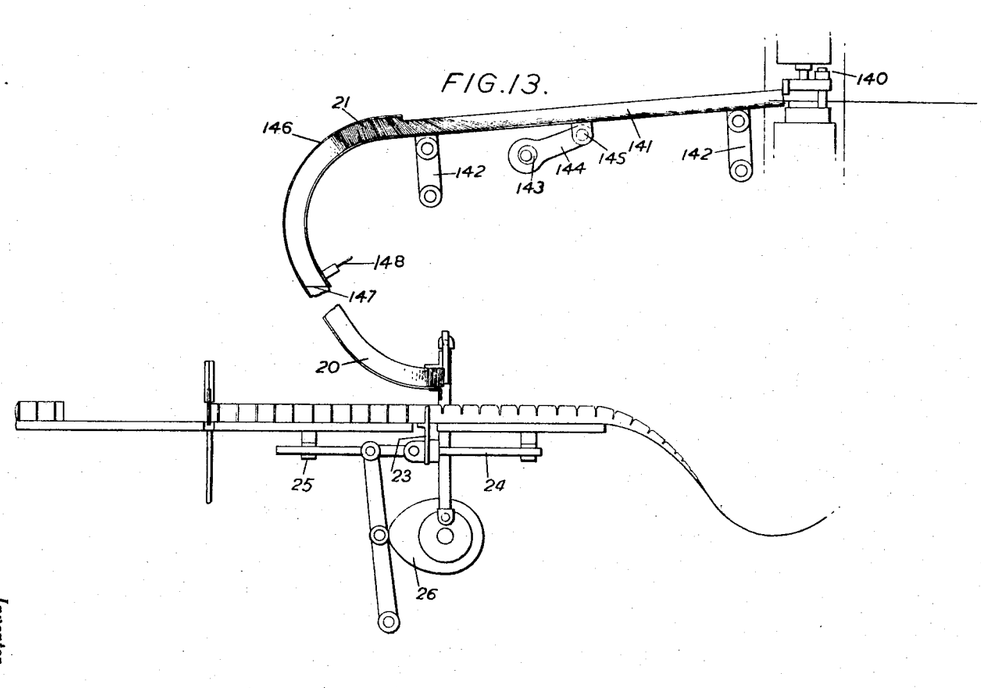
Fig. 13 is a diagrammatic side view illustrating a further mode of carrying the invention into effect.

Fig. 13 illustrates diagrammatically a reciprocating press 140 which delivers wall elements 21 to a shaker conveyor 141 mounted on parallel pivoted links 142 and vibrated or shaken by an eccentric 143 through an eccentric strap 144 connected to a pivot 145 beneath the conveyor 141.

Figure 4:
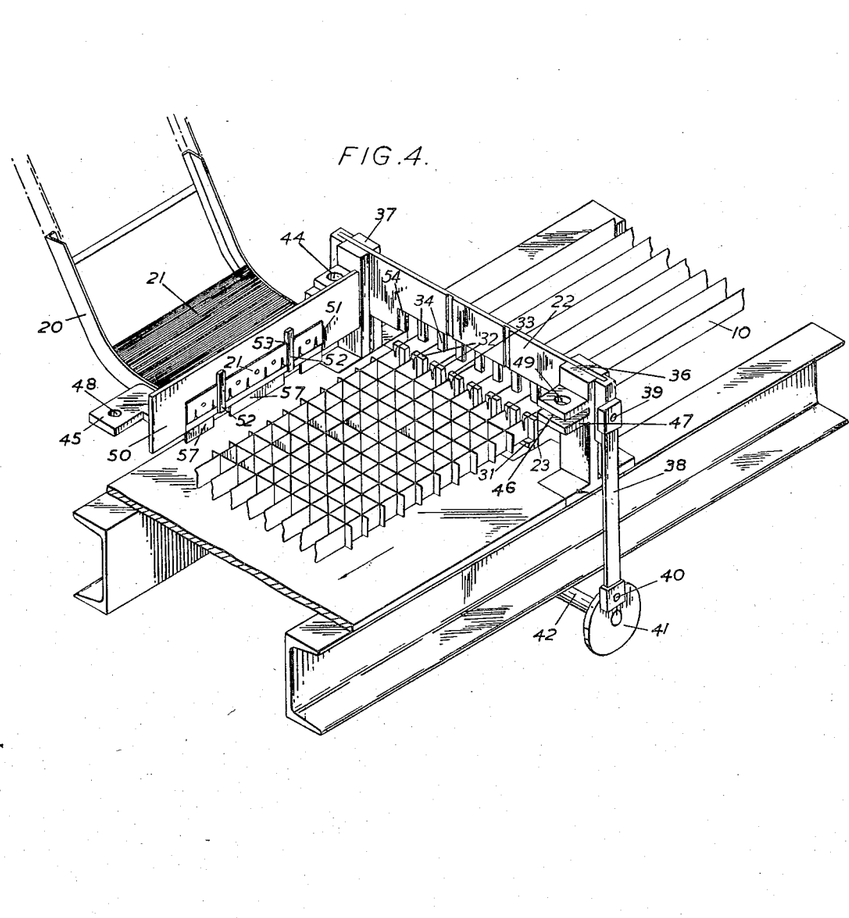
Fig. 4 is a perspective view illustrating the magazine and presser device shown diagrammatically in Fig. 1.

A further feature of the invention consists in connecting the shaker conveyor 141 with the magazine 20 through a suitably curved conveyor tray or chute 146 which meets the magazine 20 at the position indicated at 147 and which permits the magazine 20 to be opened into the position shown in Fig. 4. A cut-off gate or the like for preventing the wall elements 21 from escaping from the chute 146 when the magazine 20 is opened is indicated diagrammatically by the reference numeral 148.

I claim:

1. An apparatus for manufacturing cellular structures of the kind set forth comprising a platform, means for advancing and means for guiding along said platform a plurality of slotted strips of wall element material in parallel spaced relationship with the slots uppermost, a magazine above said platform to contain a supply of slotted wall elements disposed across the path of travel of said strips, a downwardly directed presser plate extending across the outlet of the magazine transversely of the direction of movement of the strips and having a shallow transversely extending recess in one face into which the endmost slotted wall element in the magazine can be partially received, said recess being bounded along its upper edge by a ledge of length at least equal to that of the upper edge of the slotted wall elements engaged thereby and means for reciprocating said presser plate in timed relation with the advancement of said strips to deliver wall elements in succession into engagement with the aligned slots of said strips, said presser plate being formed with a series of downwardly projecting fingers which can penetrate into the spaces between the strips to afford guidance for the wall elements at intervals along one side thereof during the whole of their movement into engagement with said strips.

2. Apparatus according to claim 1 in which said advancing means comprises a reciprocating pusher located beneath said presser plate and adapted to engage behind a delivered wall element to advance said strips and formed so as to support the strips from below substantially over the whole length thereof while the presser plate feeds a wall element into engagement with a row of slots in the strips.

3. Apparatus according to claim 2 in which said pusher comprises a pusher bar located beneath the presser plate and capable of a limited degree of foward and rearward displacement in the direction of movement of the strips and which is formed with a substantially horizontal step at a level appropriate for supporting said strips from below substantially over the whole length thereof and is formed with pairs of upstanding aligned pusher projections adapted to engage behind a delivered wall element to advance the strips relatively to said presser plate, the upstanding projections of each pair being spaced apart by a slit which serves as a guide for one of the strips and said pairs of upstanding projections being disposed so as to avoid the downwardly directed fingers of the presser plate.

4. Apparatus according to claim 1 comprising pivot means allowing the magazine to be angularly displaced away from the presser plate and retaining posts extending downwardly across the outlet opening of the magazine and stepped at the upper margin of the outlet opening of the magazine to enable a portion of the thickness of the endmost wall element to pass from the magazine for edgewise engagement by said presser plate, said presser plate having slots therein to accommodate said retaining posts within the thickness thereof.

5. An apparatus for manufacturing cellular structures of the kind set forth comprising a platform, means for advancing and means for guiding along said platform a plurality of slotted strips of wall element material in parallel spaced relationship with the slots uppermost, a magazine above said platform to contain a supply of slotted wall elements disposed across the path of travel of said strips, a downwardly directed presser plate extending across the outlet of the magazine transversely of the direction of movement of the strips and having a shallow transversely extending recess in one face into which the endmost slotted wall element in the magazine can be partially received, said recess being bounded along its upper edge by a ledge of length at least equal to that of the upper edge of the slotted wall elements engaged thereby means for reciprocating said presser plate in timed relation with the advancement of said strips to deliver wall elements in succession into engagement with the aligned slots of said strips, guide means extending downwardly from the outlet of the magazine and spaced from the face of the recess on the presser plate by a distance approximately equal to a thickness of a slotted wall element for cooperation with the presser plate in guiding the wall elements into engagement with the slots of said strips, said presser plate being formed with a series of downwardly projecting fingers which can penetrate into the spaces between the strips to afford guidance for the wall elements at intervals along one side thereof during the whole of their movement into engagement with said strips.

6. Apparatus for manufacturing cellular structures of the kind set forth comprising means for progressively drawing suitable sheet material such as paper-board from a roll thereof, punching means for punching successive rows of transverse slots in said sheet material, said punching means being followed by slitting means for progressively slitting sheet material longitudinally to form a plurality of strips of the material with transverse slots extending from one edge of each strip, said slitting means being followed by a platform, means for advancing and means for guiding said slotted strips along said platform in parallel spaced relationship with the slots uppermost, a magazine above said platform to contain a supply of slotted wall elements disposed across the path of travel of said strips, a downwardly directed presser plate extending across the outlet of the magazine transversely of the direction of movement of the strips and having a shallow transversely extending recess in one face into which the endmost slotted wall element in the magazine can be partially received, said recess being bounded along its upper edge by a ledge of length at least equal to that of the upper edge of the slotted wall elements engaged thereby and means for reciprocating said presser plate in timed relation with the advancement of said strips to deliver wall elements in succession into engagement with the aligned slots of said strips, said presser plate being formed with a series of downwardly projecting fingers which can penetrate into the spaces between the strips to afford guidance for the wall elements at intervals along one side thereof during the whole of their movement into engagement with said strips.

7. An apparatus for manufacturing cellular structures of the kind set forth comprising a platform, means for advancing and means for guiding along said platform a plurality of slotted strips of wall element material in parallel spaced relationship with the slots uppermost, a magazine above said platform to contain a supply of slotted wall elements disposed across the path of travel of said strips, a downwardly directed presser plate extending across the outlet of the magazine tranversely of the direction of movement of the strips and having a shallow transversely extending recess in one face into which the endmost slotted wall element in the magazine can be partially received, said recess being bounded along its upper edge by a ledge of length at least equal to that of the upper edge of the slotted wall elements engaged thereby means for reciprocating said presser plate in timed relation with the advancement of said strips to deliver wall elements in succession into engagement with the aligned slots of said strips, said presser plate being formed with a series of downwardly projecting fingers which can penetrate into the spaces between the strips to afford guidance for the wall elements at intervals along one side thereof during the whole of their movement into engagement with said strips and means operated at intervals during which a predetermined number of slotted wall elements have been fed into engagement with said strips for severing the strips between two adjacent wall elements to detach a predetermined length of cellular structure therefrom.

8. Apparatus for manufacturing cellular structures of the kind set forth comprising guide means for maintaining a plurality of slotted strips of wall element material on edge in parallel spaced relationship, means for advancing said strips in the direction of their length, supply means arranged to deliver slotted wall elements so that they extend lengthwise in a direction across the path of travel of said strips, a presser plate associated with said supply means adapted to receive wall elements in succession from said supply means and to deliver them into engagement with aligned slots in said strips in timed relationship with the advancing of the strips, a guillotine adapted to cut the strips substantially simultaneously between two wall elements to detach cellular structures of given length, said guillotine comprising a pair of blade carriers having blades extending downwardly therefrom and one of which is longitudinally displaceable relatively to the other in a direction across the path of travel of the formed cellular structure, pivot means and guide means for said blade carriers enabling the blade carriers to be angularly displaced from a raised inoperative position above the path of travel of the formed cellular structure down to an operative position in which the blades of the respective blade carriers lie on opposite sides of the strips of the formed cellular structure and means for causing angular displacement of the blade carriers about said pivot means comprising a constantly rotating shaft, clutch means associated with said shaft of the kind which automatically disengages itself after it has performed a single revolution, means driven by said clutch and associated with said blade carriers for converting a rotary motion to a reciprocatory motion, electrical relay means for controlling the engagement of said clutch, a switch controlling said relay and a counting device for controlling said switch, said counting device being arranged to count wall elements fed to said strips whereby to cause the clutch to be engaged at intervals during which a predetermined number of wall elements have been fed to said strips.

9. Apparatus for manufacturing cellular structures of the kind set forth comprising guide means for maintaining a plurality of slotted strips of wall element material on edge in parallel spaced relationship, means for advancing said strips in the direction of their length, supply means arranged to deliver slotted wall elements so that they extend lengthwise in a direction across the path of travel of said strips, a presser plate associated with said supply means adapted to receive wall elements in succession from said supply means and to deliver them into engagement with aligned slots in said strips in timed relationship with the advancing of the strips, a guillotine adapted to cut the strips substantially simultaneously between two wall elements to detach cellular structures of given length, said guillotine comprising a pair of blade carriers having blades extending downwardly therefrom and one of which is longitudinally displaceable relatively to the other in a direction across the path of travel of the formed cellular structure, pivot means and guide means for said blade carriers enabling the blade carriers to be angularly displaced from a raised inoperative position above the path of travel of the formed cellular structure down to an operative position in which the blades of the respective blade carriers lie on opposite sides of the strips of the formed cellular structure, means for causing angular displacement of the blade carriers about said pivot means, abutments on said blade carriers, a compression spring between said abutments adapted when released from a loaded condition to cause relative cutting movement of said blade carriers, means for automatically loading said spring on upward angular movement of the blade carriers after a cutting operation, a detent element adapted automatically to lock said spring in a loaded condition as the blade carriers approach their uppermost angular position and means for releasing said detent element automatically as the blade carriers approach their lowermost angular position.

References Cited in the file of this patent

UNITED STATES PATENTS

| 296,288 | Jaeger et al. | Apr. 1, 1884 |
| 980,103 | Kendrick | Dec. 27, 1910 |
| 1,154,237 | Dixon | Sept. 21, 1915 |
| 2,224,220 | Dauber | Dec. 10, 1940 |
| 2,497,318 | McLaughlin et al. | Feb. 14, 1950 |
| 2,710,565 | Schroeder | June 14, 1955 |
| 2,744,751 | Janz | May 8, 1956 |
| 2,754,731 | Shields | July 17, 1956 |

FOREIGN PATENTS

| 59,458 | Denmark | Feb. 2, 1942 |

UNITED STATES PATENT OFFICE
CERTIFICATE OF CORRECTION

Patent No. 2,870,694                                                January 27, 1959

Robert Colvin Blair

It is hereby certified that error appears in the above numbered patent requiring correction and that the said Letters Patent should read as corrected below.

In the heading to the printed specification, lines 7 and 8, for "Claims priority, application Great Britain January 20, 1955" read -- Claims priority, application Great Britain December 12, 1953 --.

Signed and sealed this 12th day of May 1959.

(SEAL)
Attest:

KARL H. AXLINE                                                      ROBERT C. WATSON
Attesting Officer                                           Commissioner of Patents